(12) United States Patent
Akerib

(10) Patent No.: US 6,507,362 B1
(45) Date of Patent: *Jan. 14, 2003

(54) DIGITAL IMAGE GENERATION DEVICE FOR TRANSMITTING DIGITAL IMAGES IN PLATFORM-INDEPENDENT FORM VIA THE INTERNET

(75) Inventor: Avidan Akerib, Tel Aviv (IL)

(73) Assignee: Neomagic Israel Ltd., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/003,139

(22) Filed: Jan. 6, 1998

Related U.S. Application Data

(63) Continuation-in-part of application No. 08/353,612, filed on Dec. 9, 1994, now Pat. No. 5,809,322.

(51) Int. Cl.[7] ......................... H04N 5/232; G06F 15/00; G06F 15/76
(52) U.S. Cl. ......................................... 348/211; 712/11
(58) Field of Search ................................ 348/211, 207, 348/222, 212, 213, 143, 333.01, 14.07, 14.02, 14.03, 14.05; 709/250, 201, 203, 204, 217, 219, 231, 232, 246, 235; 455/566, 33.1, 408, 418, 419; 712/11, 34, 35, 14, 36, 12–13, 15–19, 22; 710/33; 711/202; 706/48, 50

(56) References Cited

U.S. PATENT DOCUMENTS

| | | | | | |
|---|---|---|---|---|---|
| 4,580,215 A | * | 4/1986 | Morton | ......................... | 712/13 |
| 5,343,559 A | * | 8/1994 | Lee | ............................ | 711/202 |
| 5,579,441 A | * | 11/1996 | Bezek et al. | .................. | 706/50 |
| 5,640,193 A | * | 6/1997 | Wellner | ....................... | 709/218 |
| 5,699,457 A | | 12/1997 | Adar et al. | | |
| 5,806,005 A | * | 9/1998 | Hull et al. | .................... | 455/566 |
| 5,974,521 A | * | 10/1999 | Akerib | ......................... | 712/11 |
| 6,018,774 A | * | 1/2000 | Mayle et al. | ................ | 709/250 |
| 6,035,323 A | * | 3/2000 | Narayen et al. | ............ | 709/201 |
| 6,067,571 A | * | 5/2000 | Igarashi et al. | ............. | 709/232 |
| 6,067,624 A | * | 5/2000 | Kuno | ......................... | 713/202 |
| 6,088,737 A | * | 7/2000 | Yano et al. | ................. | 709/235 |
| 6,092,088 A | * | 7/2000 | Takeda | ....................... | 707/500 |
| 6,133,941 A | * | 10/2000 | Ono | ........................... | 348/143 |
| 6,239,836 B1 | * | 5/2001 | Suzuki et al. | ............... | 348/211 |
| 6,288,716 B1 | * | 9/2001 | Humpleman et al. | ....... | 709/217 |

OTHER PUBLICATIONS

"Adobe PostScript 3", Adobe Sytems, Inc., 345 Park Ave., San Jose, CA 95110–2704.

* cited by examiner

Primary Examiner—Aung S. Moe
(74) Attorney, Agent, or Firm—Dekel Patent Ltd.

(57) ABSTRACT

An Internet imaging device, such as camera, scanner and digital television display, is disclosed. The device combines the advantages of platform-independent page description languages, such as Adobe PostScript 3, with an imaging device that connects directly to remote locations via the Internet. The device outputs image data and image processing commands in a platform-independent page description language via cordless communication such as a cellular phone. The data are transferred directly to remote display units, such as printers and digital televisions, thereby eliminating two personal computers (PCs): one at the input end of the communication and one at the output end. The device taught by the present invention need not include a flash memory or other storage medium, as images are transferred directly when generated.

6 Claims, 3 Drawing Sheets

DIGITAL IMAGE GENERATION DEVICE FOR TRANSMITTING DIGITAL IMAGES IN PLATFORM-INDEPENDENT FORM VIA THE INTERNET

This is a continuation-in-part of U.S. patent application Ser. No. 08/353,612, filed Dec. 9, 1994, now U.S. Pat. No. 5,809,322, issued Sep. 15, 1998.

FIELD AND BACKGROUND OF THE INVENTION

The present invention relates to digital image generation devices, such as cameras and scanners as well as digital television sets and the like, and, more particularly, to a digital image generation device that communicates image data directly to numerous remote locations by transmitting data in a platform-independent format via the Internet.

CAMERAS

The field of photography and photo development is on the threshold of a paradigm shift from chemical imaging, to digital imaging. Digital cameras have many important features:

i) pictures are developed using a computer rather than a chemical process, greatly reducing processing time and the cost of custom equipment;

ii) anyone having a personal computer (PC) and some inexpensive software can develop digital pictures and transmit them via digital medium, such as email or the internet, to numerous remote locations instantly.

iii) filters and image enhancements are applied digitally, using software, rather than chemical hardware, affording significant reductions in processing time and cost while providing greater flexibility and accuracy. For example, to those skilled in the art it is trivial to access individual pixels digitally, compared to chemical photo processing where such a task is often prohibitively complicated.

Current digital cameras feature memory modules, such as a flash memory, for storing images taken with the camera. Users load the memory module with digital images via the camera and then upload the images from the memory module to their PC for viewing. It would be highly advantageous to have a system whereby the camera would not require a flash memory or other similar memory, because this would reduce the cost of the camera.

In addition, communication via the Internet is done primarily via PC, utilizing memory and other processing resources from the PC It would be highly advantageous to have a camera that communicates directly via the Internet without the need for a user to upload images from the camera to his PC.

Digital cameras also perform image processing on the camera. This requires that cameras feature a powerful CPU, greatly increasing the cost of the camera In addition, with new image processing algorithms being developed constantly, users are obliged to upgrade the software running on their cameras in order to obtain the sharpest images. A further drawback of the present system is that the transfer of data is quite heavy as the entire processed image is transferred.

A number of platform-independent page description languages and formats have been developed. Examples include PostScript Level 3 and Portable Document format (pdf) developed by Adobe Corporation, and hypertext markup language (HTML). These formats are suitable for defining text, images and graphics. A number of page description languages enable including image-processing commands to the page description file. These commands are then executed at the destination, for example at a printer. In the context of the present invention, the term page description language refers to formats such as pdf and PostScript 3 that enable including image processing commands to the page description file.

One of the advantages of using page description languages is that they transfer many image-processing tasks from the PC to the printer. Using a page description language, less processing is performed on the PC. For example, instead of transferring an entire processed image from PC to printer, using a page description language the unprocessed image is transferred together with a header containing commands defining which image processing operations to execute. The printer executes image processing based on the commands in the file header. More information can be found in the Adobe PostScript 3 White Paper available at:

htlp://www.adobe.com/prodindex/postscript/details.htmlglevel3.

It would be highly advantageous to combine the advantages of platform-independent page description language with a camera that connects directly to remote locations via the Internet. Such a system would reduce cost of the camera by eliminating the need for image-storage memory modules such as flash memory on the camera, and make the generated images available at numerous remote locations momentarily after the camera generates the images Further, the photographer need not update the software on his camera equipment; only the software on the remote printers need be updated to deliver the sharpest images. Example applications include news and sports reporting whereby photojournalists would transfer images directly to printer stations at news clients. Using such a system the camera would transfer the basic image and commands for image processing to be executed at the remote location (or, several remote locations).

SCANNERS

A number of hand-held portable scanners are currently available. It would be highly advantageous to have a hand-held portable scanner that converts images into a platform-independent page description language and relay the scanned information immediately to numerous remote locations via the Internet.

One advantage of certain page description languages is that they enable including text together with the page description file, either as a separate file, or together in a single file. It would be highly advantageous to have a scanner featuring optical character recognition (OCR) technology and converting scanned pages into a platform-independent page description language and further capable of transmitting both text and image information immediately to numerous remote printer and display locations via the Internet, without the need to upload data to a PC.

OTHER APPLICATIONS

Another instance of the digital image generation device according to the teachings of the present invention is the digital display, such as a digital television screen. It would be highly advantageous to enable viewers to capture images seen on television by sending them directly from the digital television to numerous remote printer and display stations via the Internet. The advantages listed above regarding scanners and digital cameras are not repeated here for the sake of brevity.

There is thus a widely recognized need for, and it would be highly advantageous to have a digital image generation device, such as a digital camera, scanner and digital television that communicates images using a platform-independent page description language directly via the Internet. Many further advantages of the present invention will become apparent from the description below.

SUMMARY OF THE INVENTION

According to the present invention there is provided digital image generation device that communicates directly with at least one remote image-output unit via the Internet using a page description language. In the context of the present invention the term image-output unit (or simply, image-output) refers to electronic displays such as digital television sets, and hard-copy display systems, such as printers. The device features an Internet protocol (IP) address to enable direct communication via the Internet and includes:

an image-input unit that inputs image data, a processing unit that receives image data from the input unit, converts this data into a page description language including at least one command to execute an image processing function at a remote image-output unit, a communication unit that receives page description language data from the processing unit and transmits that data to the remote image-output unit via the Internet. Using the Internet, the data are transmitted to numerous remote units in parallel with case.

One of the advantages of the present invention is that data are passed from one unit to the next directly, without being stored in a flash memory or other storage medium.

According to a preferred embodiment of the invention described below, the communication unit is cordless, such as, but not limited to, a cellular phone.

According to further features in preferred embodiments of the invention described below, the device is a digital camera.

According to further features in preferred embodiments of the invention described below, the device is a scanner.

According to further features in preferred embodiments of the invention described below, the device is a digital television.

According to further features in preferred embodiments of the invention described below, the processing unit includes an associative processor. An example of such an associative processor is disclosed in U.S. patent application Ser. No. 08/353,612, now U.S. Pat. No. 5,809,322, and U.S. patent application Ser. No. 08/602,871, both herein incorporated by reference as if fully set forth herein.

According to still further features in preferred embodiments of the invention described below, the communication unit receives commands to take pictures from a remote unit via the Internet.

According to farther features in preferred embodiments of the invention described below, the camera transmits a picture to an address included in the command that requested the picture.

According to further features in preferred embodiments of the invention described below, the camera transmits a picture to the remote unit that issued the command. In Internet communication, each packet of information includes a source address and a destination address. According to the present embodiment, the camera identifies the address of the remote unit by the response address included in the packet of communication containing the command.

The present invention also teaches using the device of the present invention in a surveillance system.

According to further features in preferred embodiments of the invention described below, the digital image generation device features a user interface enabling the user to insert additional visual elements in the page description, such as title, time, name and overlaying the image with additional text or images. For example, a digital camera features a screen or lens that displays the generated image and allows the viewer to insert additional visual elements into the frame. The entire frame is then converted to a page description language (pdl), including the elements added by the viewer. Because the image is converted to a page description language, the viewer can insert additional elements at any location within the image and the resulting image is converted to pdl.

The present invention also teaches an imaging system that incorporates the image generation device disclosed into a comprehensive system featuring at least one, but typically a plurality of, image-output units in communication with the image generator via the Internet.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is for a digital image generation device such as a camera or scanner. Specifically, the present invention can be used to capture images and transmit them directly to remote display units via the Internet.

The principles and operation of image capture and transmission according to the present invention may be better understood with reference to the drawings and the accompanying description, it being understood that these drawings are given for illustrative purposes only and are not meant to be limiting.

Figure 1:
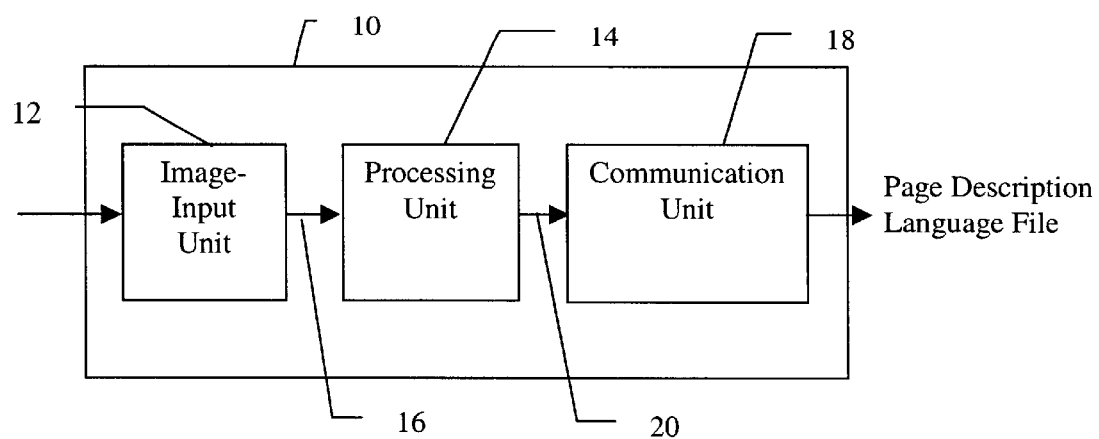
FIG. 1 is a block diagram of the image generation device according to the teachings of the present invention.

Referring now to the drawings, FIG. 1 is a block diagram of the main units of a digital image generation device 10 These main units include:

1. An image-input unit 12 for generating the image. In a digital camera and scanner image-input unit 12 is typically a sensory unit that inputs the image via a lens. In digital television, image-input unit 12 is the screen (display), which receives broadcast image data in either analog or digital format.

2. A processing unit 14 for receiving a digital image from image-input unit 12, for example through a data bus 16. Tasks of processing unit 14 include defining image processes to be applied to the image, compressing the image and converting the compressed digital image data into a page description language. Processing unit 14 outputs a file that includes image-processing commands to a communication unit 18. An example of processing unit 14 is an associative processor. An example of an associative processor is disclosed in U.S. patent application Ser. No. 08/353,612, now U.S. Pat. No. 5,809,322, and U.S. patent application Ser. No. 08/602,871, both herein incorporated by reference as if fully set forth herein.

3. Communication unit 18 for receiving the page description language file from processing unit 14 and transferring this data to several remote image-output units via the Internet. Communication unit 18 could receive the page language description file from processing unit 14 through a second data bus 20, for example. Communication unit 18 features a unique IP address, enabling direct communication via the Internet. Communication unit 18 can be a cellular phone, but other communication devices and methods are also feasible.

Figure 2:
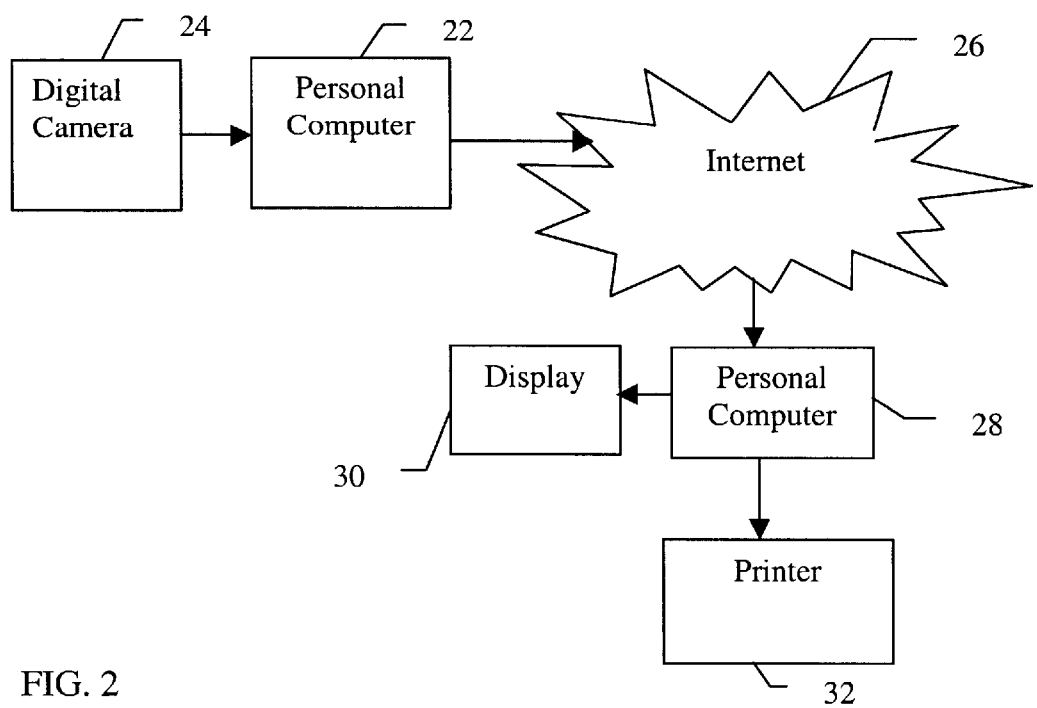
FIG. 2 illustrates the flow of information when transmitting image data over the Internet according to the prior art.

FIG. 2 illustrates how communication is performed according to the prior art. Image data are transferred to a personal computer (PC) 22, typically by uploading data from memory on a digital camera 24 or scanner (not shown) to PC 22. The data are then transferred from PC 22, via the Internet 26, to a remote PC 28. Remote PC 28 can optionally have a display 30 for displaying the data. Remote PC 28 transfers the data to connected peripheral devices, such as a printer 32 or scanner.

Figure 3:
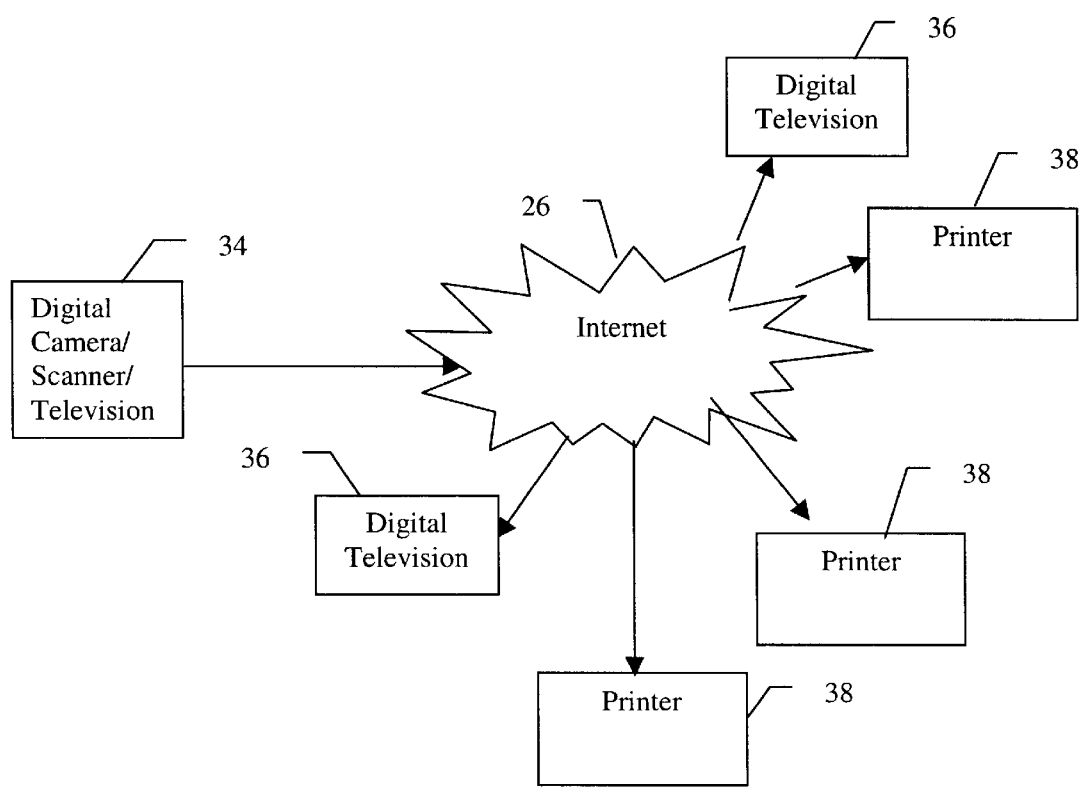
FIG. 3 illustrates the flow of information when transmitting image data over the Internet according to the teachings of the present invention.

According to the teachings of the present invention, the camera or scanner and the peripheral devices connect to each other directly via the Internet This is illustrated in FIG. 3.

Because the device outputs a platform-independent page description file, this file is compatible with a wide variety of remote peripheral devices. Data are passed from a digital camera 34 or scanner to remote image-output units such as a digital television set 36, of which two are shown as examples, and a printer station 38, of which three are shown as examples The communication does not traverse a personal computer at the side of the photographer or at the side of the printer station.

In operation, the user typically connects to the Internet 26 using the communication unit and proceeds to take pictures with camera 34. Image data are processed on camera 34 by the processing unit. Typically, this processing includes merely defining image processing unctions to be executed by the remote image-output unit The image file, together with commands to execute the image processing functions mentioned are combined into a single file, this file is compressed and sent, via the Internet 26 to numerous remote printer locations 38, for example. The Internet protocol (IP) addresses of the remote locations are issued by the communication unit. These can be pre-loaded addresses, or the addresses can be returned after performing a search using one of many Internet search engines.

According to one embodiment, the present invention can be used as part of an alarm system. The camera of the present invention is situated at the site of the alarm, for example, in a shop. When the alarm goes off, the camera records images and forwards them directly to an Internet television in the proprietor's home, and to a display in a patrol company's headquarters.

According to another embodiment, the user can request that the camera take pictures and transmit them to the user located at a remote location. For example, the camera of the present invention can be situated in a shop, as described above. The proprietor can issue a command from his PC or Internet TV at home to the camera to take a picture and to transmit that picture over the Internet back to the proprietor. In this way, the proprietor can view his shop without leaving home.

Another use of the present invention is for traffic monitoring by the police, whereby speeding cars are photographed by the camera of the present invention. The photo is relayed instantly to various strategic locations. One example is to relay the photo to a display inside a police car situated a short distance away from the camera. Officers in the police car would be able to clearly identify the speeding car when it approaches and stop the car.

According to a preferred embodiment, the device of the invention is a scanner featuring OCR technology. In operation, the scanner identifies text areas and image areas on the scanned page, performs OCR on the text and compresses the image areas. One example compression method is JPEG compression. The output data are text and compressed image elements in a page description language, that are transmitted to at least one remote location via the Internet. The process of identifying textual elements and graphic elements within a page is well known to those skilled in the art of optical character recognition and image processing.

Wile the invention has been described with respect to a limited number of embodiments, it will be appreciated that many variations, modifications and other applications of the invention may be made.

What is claimed is:

1. A digital image generation device comprising:
   (a) an image input unit for inputting image data;
   (b) a processing unit, comprising an associative processor, for receiving said image data from said input unit and converting said data into a platform-independent page description language (pdl) including at least one command to execute an image enhancement processing function at a remote image-output unit; and
   (c) a communication unit for receiving said pdl data from said processing unit and directly transmitting said pdl data to said remote image-output via the Internet, wherein said associative processor includes:
      (i) an array of processors, each said processor including a multiplicity of content addressable memory (CAM) cells, said array forming a two dimensional array of said content addressable memory cells, each sample of an incoming signal being processed by at least one of said processors using at least one of said memory cells; and
      (ii) a linear register array including a plurality of registers operative to store responders arriving from the processors and to provide communication, within a single cycle, between non-adjacent processors processing non-adjacent samples.

2. A digital image generation device comprising:
   (a) an image input unit for inputting image data;
   (b) a processing unit, comprising an associative processor, for receiving said image data from said input unit and converting said data into a platform-independent page description language (pdl) including at least one command to execute an image enhancement processing function at a remote image-output unit; and
   (c) a communication unit for receiving said pdl data from said processing unit and directly transmitting said pdl data to said remote image-output unit via the Internet, wherein said associative processor includes:
      (i) an array of processors, each said processor including a multiplicity of content addressable memory (CAM) cells, said array forming a two dimensional array of said content addressable memory cells, each sample of an incoming signal being processed by at least one of said processors using at least one of said memory cells;
      (ii) a linear register array including at least one register operative to store responders arriving from the processors and to provide communication, within a single cycle, between non-adjacent processors; and
      (iii) an I/O buffer register including CAM cells operative to input and output a signal.

3. A digital image generation device comprising:
(a) an image input unit for inputting image data;
(b) a processing unit, comprising an associative processor, for receiving said image data from said input unit and converting said data into a platform-independent page description language (pdl) including at least one command to execute an image enhancement processing function at a remote image-output unit; and
(c) a communication unit for receiving said pdl data from said processing unit and directly transmitting said pdl data to said remote image-output unit via the Internet, wherein said associative processor includes:
  (i) an array of processors, each processor including a multiplicity of associative memory cells, said memory cells being operative to perform:
    (A) compare operations, in parallel, on a plurality of samples of an incoming signal, and
    (B) write operations, in parallel, on said plurality of samples of said incoming signal; and
  (ii) an I/O buffer register including a multiplicity of associative memory cells, said register being operative to:
    (A) input said plurality of samples of said incoming signal to said array of processors in parallel by having said I/O buffer register memory cells perform at least one associative compare operation and said array memory cells perform at least one associative write operation, and
    (B) receive, in parallel, a plurality of processed samples from said array of processors by having said array memory cells perform at least one associative compare operation and said I/O buffer register memory cells perform at least one write operation.

4. A digital image generation device comprising:
(a) an image input unit for inputting image data;
(b) a processing unit, comprising an associative processor, for receiving said image data from said input unit and converting said data into a platform-independent page description language (pdl) including at least one command to execute an image enhancement processing function at a remote image-output unit; and
(c) a communication unit for receiving said pdl data from said processing unit and directly transmitting said pdl data to said remote image-output unit via the Internet, wherein said associative processor includes:
  (i) an array of processors, each processor including a multiplicity of associative memory cells, said memory cells being operative to perform:
    (A) compare operations, in parallel, on a plurality of samples of an incoming signal, and
    (B) write operations, in parallel, on the plurality of samples of the incoming signal;
  (ii) a register array including at least one register operative to:
    (A) store, in parallel, responders arriving from said associative memory cells in a plurality of said processors, and
    (B) provide communication, within a single cycle, between a plurality of pairs of non-adjacent processors in said array of processors; and
  (iii) an image correction system whereby:
    (A) a multiplicity of pixels from a distorted image are provided to a respective multiplicity of said associative memory cells,
    (B) a transformation for an output of said image to compensate for said distortion is provided, and
    (C) said transformation is executed in parallel for a plurality of said pixels via said register array.

5. A digital image generation device comprising:
(a) an image input unit for inputting image data;
(b) a processing unit, comprising an associative processor, for receiving said image data from said input unit and converting said data into a platform-independent page description language (pdl) including at least one command to execute an image enhancement processing function at a remote image-output unit; and
(c) a communication unit for receiving said pdl data from said processing unit and directly transmitting said pdl data to said remote image-output unit via the Internet, wherein said associative processor includes:
  (i) an array of processors, each processor including a multiplicity of associative memory cells, at least one of the processors being operative to process a plurality of samples of an incoming signal;
  (ii) a register array including at least one register operative to store responders arriving from the processors and to provide communication between processors;
  (iii) an I/O buffer register operative to input an incoming signal and to output an outgoing signal; and
  (iv) an image correction system whereby:
    (A) a multiplicity of pixels from a distorted image are provided to a respective multiplicity of said associative memory cells,
    (B) a transformation for an output of said image to compensate for said distortion is provided, and
    (C) said transformation is executed in parallel for a plurality of said pixels via said register array.

6. A digital image generation device comprising:
(a) an image input unit for inputting image data;
(b) a processing unit, comprising an associative processor, for receiving said image data from said input unit and converting said data into a platform-independent page description language (pdl) including at least one command to execute an image enhancement processing function at a remote image-output unit; and
(c) a communication unit for receiving said pdl data from said processing unit and directly transmitting said pdl data to said remote image-output unit via the Internet, wherein said associative processor includes:
  (i) a two-dimensional array of processors, each processor including a multiplicity of content addressable memory cells, each sample of an incoming signal being processed by at least one of the processors;
  (ii) a register array including at least one register operative to store responders arriving from the processors and to provide communication, within a single cycle, between non-adjacent processors; and
  (iii) an image correction system whereby:
    (A) a multiplicity of pixels from a distorted image are provided to a respective multiplicity of said content addressable memory cells,
    (B) a transformation for an output of said image to compensate for said distortion is provided, and
    (C) said transformation is executed in parallel for a plurality of said pixels via said register array.

* * * * *